Dec. 9, 1969    G. F. CARLSON ET AL    3,482,624
THREE-WAY VALVES

Filed Jan. 13, 1967    4 Sheets-Sheet 1

INVENTOR
F. G. CARLSON
BY F. E. DAMERSON

ATTORNEY

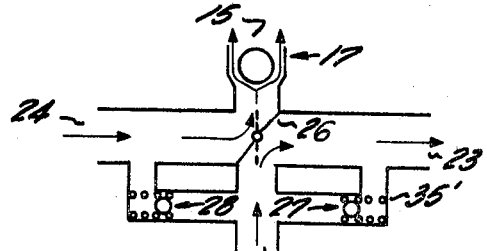
FIG. 3a
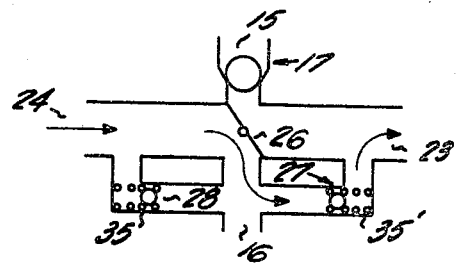
FIG 3b
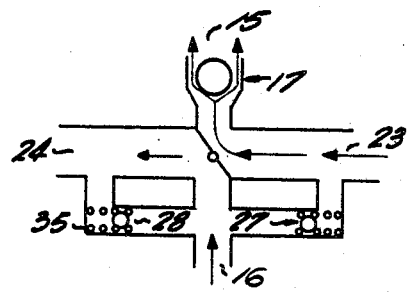
FIG. 3c
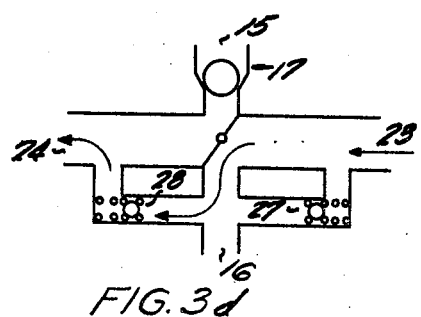
FIG. 3d
FIG. 3

3,482,624
THREE-WAY VALVES
Gilbert Fritz Carlson, Skokie, and Francis Eugene Dameron, Chicago, Ill., assignors to International Telephone and Telegraph Corporation
Filed Jan. 13, 1967, Ser. No. 609,131
Int. Cl. F24b *3/00;* F25b *29/00;* F16k *31/18*
U.S. Cl. 165—22                                          19 Claims

ABSTRACT OF THE DISCLOSURE

A four port three-way valve of the type used to control by-pass in hydronic temperature control arrangements. The valve incorporates a movable butterfly disc with built-in check valves for controlling the by-pass flow. The four port valve enables simplified automatic hydronic temperature control systems.

---

This invention relates to hydronic temperature control systems and more particularly to three way or zone control valves for use in such systems.

Present day hydronic temperature control systems utilize heat exchangers for either heating or cooling specified areas or zones. Control valves are used in combination with fan coils, for example, to regulate the flow of heated or cooled fluid through the coil of the heat exchanger thereby effectively controlling the temperature of the zone served by the exchanger. The control valves are of two generalized types; two-way (non bypass) or three-way bypass.

Conventional two way valves are operated as quick opening two position valves; either fully open or fully closed. A second basic type of two way valve control is by modulation. The valve opens or closes on control demand so as to regulate the amount of water flowing through the valve in accordance with the space load requirement. The conventional two way modulating valve is of "contoured" design, the contoured "plug" relates valve plug movement to flow and this relationship in turn is interrelated to load.

Modulated control using contoured two way control valves are generally considered superior to three way bypass control because the two way valve can be equal percentage contoured (good flow-load movement relationship) as opposed to the less satisfactory three way bypass "linear" contour. Despite this fact, three way valves are often used because:

(1) The conventional two way valve is subject to highly variable operator force requirements. When all valves are open, the differential valve pressure drop is low and the operation of a single valve to the opened or closed position requires minimum operator force. When almost all valves are closed, however, the entire system pump differential head can apply across the valve; thereby requiring greatly increased valve operator force;

(2) Three way bypass provides immediate hot or cold water availability. The use of bypass valves assures that the fluid of the proper temperature is immediately available to effect the desired temperature control and establishes a fairly constant main flow rate at all times.

The conventional bypass valves presently available are three port, three-way valves. Various specific designs are used but all comprise a T shaped configuration. One arm of the T is connected to the supply. The opposite arm of the T is connected to a bypass to return piping connection.

At full load the opening to the bypass is closed and full flow occurs through the coil. During partial load with valve operators providing modulating control, only a partial flow occurs through the coil while a portion of the flow occurs through the bypass. At no load, the valve must be capable of completely stopping the flow through the coils and pass the entire flow through the bypass piping. Thus, the conventional commonly used bypass necessitates the contemporaneous use of bypass piping along with its inherent need for extra fittings. In addition, in order to provide the desired positive cut-off, relatively expensive valving, such as that supplied by rotary disc type or globe type valves have been used. These types of valves require greater operating power than do valves utilizing butterfly vanes.

Another detrimental feature of the normally used control valve whether two or three way is that it cannot be used with equal facility for controlling the chilled fluid or cooling the zone and the hot fluid for heating the zone. That is, the normally used bypass valve is designed either to introduce hot fluid into the fan coil heat exchanger to heat a zone or else to introduce cold fluid into the heat exchanger to cool a zone. With the presently available valves, the same valve cannot be used without substantial additional controls, valves and piping to serve in a system providing both the heating and the cooling operation.

In greater detail, a room which is too warm requires a reduction in hot water flow or, if chilled water is flowing, an increase in chilled water flow. The reversed control action is conventionally tripped by a fluid (hot or cold) temperature sensor which, in turn, causes a mechanical or control power reversal. The need for a reversal mechanism of some sort causes valve design problems. One solution involves controlling the flow so that it is unidirectional through heat exchange coils. Normal valves are inherently not amenable to control bidirectional flow. More specifically, they cannot control the flow in the fan coils to make it unidirectional even when the supply comes from either of two directions. Unidirectional flow in the fan coil precludes venting and air binding operational problems that occur with bidirectional flow.

Accordingly, an object of this invention is to provide a new and unique valve which can be used in hydronic temperature control systems for controlling the flow of either hot or chilled liquids with equal facility and without necessitating any changes in the valve, in the valve operator, or in the valve controller used to control the valve in both the heating and cooling modes. Thus, it is also an object of this invention to provide such hydronic temperature control systems wherein the valves or valve controllers are not required to provide "reversing" action to control zone temperature irrespective of fluid temperature (hot or cold).

A related object of this invention is to provide a new and unique bypass valve which is capable of handling the bypass flow without the need for bypass piping.

A further object of the invention is to provide hydronic bypass temperature control systems wherein the valves control the fluid flow for heating or cooling dependent on the direction of fluid flow without the use of fluid temperature sensors.

Another objective of this invention is to provide a relatively inexpensive two way valve providing tight shut off to the heat transfer element while allowing sufficient bypass to maintain immediate temperature response availability.

Still a further object of this invention is to provide four port valves capable of controlling bi-directional flow therethrough while maintaining unidirectional flow through heat exchangers.

According to one preferred embodiment of the invention, the valve comprises a four port valve, utilizing a butterfly gate for controlling the amount of fluid passing through the heat exchanger. A check valve integral to one of the two channels assures an unidirectional fluid flow. The butterfly gate or vane either has built in check valves or the body or a gate of the valve is constructed to enable the fluid to bypass the vane and flow to the return whether coming from the boiler in one direction or from the chiller in the other direction. The inventive valve is particularly useful as:

(1) A three-way bypass valve replacing more costly conventional valves and bypass piping; and (2) A heating-cooling control valve replacing conventional valves because of simplified heat-to-cool changeover control.

These and other objects and features of the invention and the manner of obtaining them will become more apparent, and the invention itself will be best understood by reference to the following description of an embodiment of the invention taken in conjunction with the accompanying drawings, in which:

FIG. 3 (views a, b, c and d) are schematic representations showing the operation of the valve when passing heated fluid, bypassing heated fluid, passing cooled fluid and bypassing cooled fluid;

Figure 1:
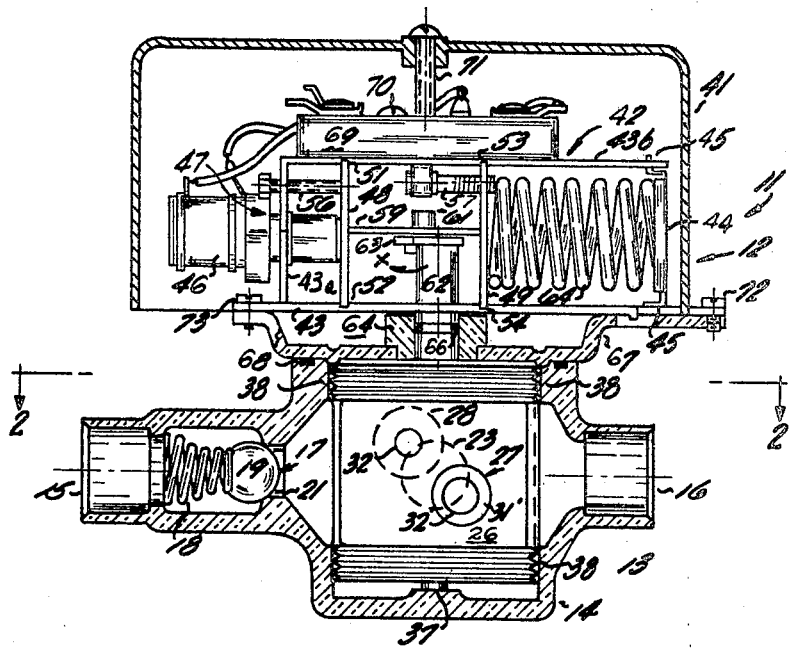
FIG. 1 is a side, sectional view of the inventive valve.
Figure 2:
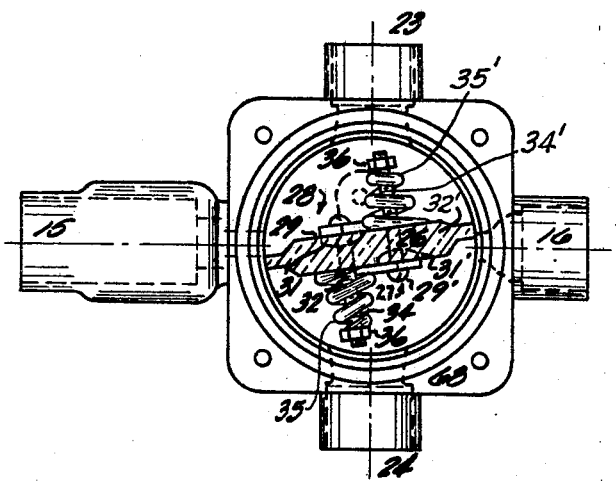
FIG. 2 is a view of the valve looking downward along line 2—2, in FIG. 1.

The essential component parts of the valve are best illustrated in FIGS. 1 and 2. The valve 11 shown in cross section in FIG. 1 externally resembles any of the normally used three way valves. The differences are apparent however, in the cross sectional view of FIG. 1 and top view of FIG. 2.

The valve 11 can be considered in two parts, that is, the operator 12 which positions the valve gate responsive to ambient conditions and the actual valve including the ports, body and vane. FIG. 1 shows the operator as a heat motor actuator type. It should be understood, however, that the inventive valve is not limited to this type of operator but will also function with any other well known operation. In fact, because of its pressure balance, among other things, the valve requires less operating force, and hence can employ a wide range of operators with equal facility.

The valve 13 is the portion of FIG. 1 below line 2—2 and is defined by the valve body 14. The body is shown with an inlet or port 15 on one side thereof and an inlet or port 16 on the opposite side of the valve body. These two ports are connected to pipe lines leading to the fan coils or other heat exchanging means located in the temperature controlled zone.

Means, such as check valve 17 assures unidirectional flow through the coils. The check valve 17 is shown as comprising a spring 18 which normally forces a valve ball 19 into seat 21 in the valve body. The check valve 17, therefore, enables flow from the supply through the valve and toward port 15 but prevents flow from entering through port 15 toward the interior of the valve.

Means are provided for connecting the valve to control fluid flowing from either of two directions; for example, means are provided for controlling the flow from either a hot water or a chilled water supply. More specifically, the valve has four ports. The two ports 15, 16 which connect the valve to control the flow of temperature determining fluid through heat exchangers in the temperature controlled zones and ports 24, 23 used to connect the valve to either a hot water or a cold water supply.

Valve gate means, such as butterfly vane 26 controls the flow volume and direction through the valve. The direction of flow is controlled when butterfly vane 26 moves sufficiently to connect ports 15, 23 and ports 16, 24 or ports 15, 24 and ports 16, 23.

Means are provided for enabling the valve controlled heated or chilled fluid to bypass the fan coils and flow instead into the return line whenever the valve gate is positioned to block the flow into the fan coils. The means for enabling the bypass flow may be the shaping of the contour of the gate and/or of the inner side of the valve body. Thus, the inside of the valve body and/or the gate may be shaped to provide space between the body and the valve gate so that when the butterfly vane or other valve gate is positioned to block fan coil flow there is sufficient space between the gate and the body to enable the fluid to pass around the gate and through the port which is connected to the return line.

In the embodiment shown herein by-pass check valves 27, 28 are used. These check valves each comprise semi-spheres 29, 29' respectively fitted into half-round ball seats 31, 31' machined into opposite sides of the butterfly vane 26. The seats are at the ends of ports which form by-pass passages 32, 32' through the vane. The semispherical gates are normally held contiguous to the half-round ball seats by springs 35, 35'. The springs 35, 35' are biased and caused to abut the vane under compression by threaded fasteners such as screws 34, 34' and mating nuts 36, 36'. Thus, the half-round balls 29, 29' normally block the by-pass paths through the butterfly vane.

In FIGS. 1 and 2 the valve is shown with ports 15, 23 and 16, 24 interconnected and with flow between ports 15, 24 and 16, 23 blocked. When the valve 11 is used to control heating, then port 24 is the high pressure port and port 23 the return port. In that case, check valve 28 operates to enable by-pass flow while check valve 27 is blocked. On the other hand, when valve 11 is used to control cooling then port 23 is high pressure port. In that case, by-pass flow passes through check valve 27 and is blocked by check valve 28.

As is shown best in FIGURE 1, the butterfly vane pivots about point contact 37 when it is rotated to vary the direction and amount of flow therethrough. The point contact pivot 37 acts to reduce the force required to change the position of the vane by reducing friction forces.

Additional friction reducing means, such as the serrations 38 shown in FIG. 1 are provided. The serrations are located on the edges of the butterfly vane where it is constantly contiguous to the body of the valve. The serrations, by reducing the vane surface area actually in contact with the valve body, reduce the friction between the vane 26 and the body 14.

The valve operator 12 is protected from dirt and dust by cover 41. The operator shown in FIG. 1 comprises a bifurcated prone positioned U-shaped base plate bracket 42. One of the long sides 43 of plate 42 serves as the base of the unit. The short vertical section 43a, the bottom of the U, joins the bottom plate 43 to the horizontal parallel top plate 43b. At the open end of the bracket 42 opposite its short, vertical side 43a, a vertical end piece 44 is fixedly attached, for example, by pins 45 between both the top of bracket 43b and bottom plate 43.

The vertical section of bracket 43a supports a heater 46 which is used to heat a paraffin container 47. The paraffin container abuts a partition 48 which is mounted in slots on the top and bottom portions of plate bracket 42. When the heater 46 heats the paraffin in container 47, the paraffin expands and exerts pressure on vertical partition 48.

Parallel to and spaced apart from vertical partition 48 is a second vertical partition 49. The partitions are mounted within slots 51, 52 and 53, 54 respectively on the top and bottom horizontal sections of bracket 42.

Partition 48 is located in the slot by abutting adjustable screw 56. Screw 56 in addition to providing an initial location for partition 48 can be used to manually operate the valve. Another screw member 57 is used to position partition 49.

Partitions 48, 49 are joined by horizontal plate 59 which is connected to both partions in any well known manner. The plate 59 is slotted for coupling to cam 61 which is offset from vertical shaft 62 by its location on disk 63, which is fixedly attached to the shaft. The shaft 62, in turn, is integrally coupled to butterfly vane 26 and tends to turn in the direction of arrow X when the paraffin is heated.

A return spring 64 is compressed between end piece 44 and partition 49. The spring acts to return the partition 49 and consequently cam 61 and shaft 62 to their point of origin after the paraffin cools.

The shaft 62 rotates in valve neck 64. An O ring seal 66 maintains the fluid seal. The neck 64 may be a part of the valve plate or bracket 67 which is held connected to the body of the valve in any well known manner, not shown. A flange gasket 68 is used to complete the seal between the bracket 67 and the flange 68 of valve body 14.

The control and power electrical connections for the valves are distributed from terminal board 69. The board is held to bracket 42 by means, such as screw 70. The cover 41 is held in place by screw 71, which is threaded into board 69 when the board is secured in place on top of bracket 42. Bracket 42 is secured to plate 67 by means, such as screws 72, 73.

The operator functions to position the valve gate to block all flow to the heat exchanger or to direct all flow through the exchanger or to send a portiton of the flow through the heat exchanger and to bypass the remainder of the flow. Normally, the operation of the valve is on-off depending on the temperature and the thermostat setting. Thus, normally all of the flow is bypassed or all of the flow is sent through the coils. However, when a modulating thermostat or a bulb operator is used then a portion of the flow is bypassed and the operator keeps the vane centered as shown by the dashed line of FIG. 3a.

Normally, when the temperature drops, for example, then more power is directed by the thermostat to the heater 46. The heater heats the paraffin causing container 47 to exert pressure on plate 48. The pressure on plate 48 is, in turn, exerted on cam 61 through plate 59 pushing it to the right. The pressure on the cam causes shaft 62 to rotate in the direction of the arrow X. The rotation of the shaft moves the vane until full flow is directed through the coils. This rotation which is limited by screw 57 would connect ports 24, 15 and 23, 16 to send hot fluid through the exchanger. When the zone is warmed the thermostat reduces the electricity supplied to the heater 47. The paraffin cools and retracts. Then spring 64 pushes partition 49 against plate 59 and partition 48. Plate 59 forces the movement of cam 61 and consequently shaft 62 and vane 26. The valve then returns to bypass all flow around the exchanger. It should be noted that screw 56 can be manipulated to manually operate the valve.

The operation of the inventive valve is best illustrated in FIG. 3 which is divided into parts a, b, c and d. The same designation letters are used in all parts of FIG. 3 as were used in FIGS. 1 and 2.

Parts a and b of FIG. 3 show valve 11 used for controlling the flow of hot liquid used for heating a designated zone. Part a shows valve 11 at full load. Therein the valve is shown operated responsive to the temperature controls which causes the operator to move the vane to connect ports 24, 15 and 23, 16. When port 24 is used for the hot water supply and the valve is in the condition represented in part (a) of FIG. 3 the flow occurs as follows: the hot water from the supply is pumped into port 24, through the valve through port 15, check valve 17, a fan coil or other heat exchanger back through port 16, the valve, and port 23 to the return lines.

The pressure at port 24 is higher than the pressure at port 16; therefore, check valve 28 prevents any flow between ports 24 and 16. Similarly, since there is low pressure at port 16 connected to the return from the fan coil and at port 23 connected to the line returning to the supply, bias spring 35' prevents flow between ports 16 and 23 through check valve 27.

When the zone under the control of valve 11 is heated sufficiently then the valve operator causes the butterfly vane to rotate until it returns to its position blocking flow into the coils.

When the zone is too hot then the vane is rotated to the no-load position. When the valve is in the no-load position as shown in FIG. 3(b) flow occurs from the pump, port 24, check valve 27, port 23 and returns to the supply. No flow occurs through the fan coil because check valve 17 blocks flow from the coil through port 15. Pressure builds up at port 16 to practically equal that of port 24. Thus, spring 35 prevents the opening of check valve 28. On the other hand, the difference in the pressure between ports 16 and 23 causes check valve 27 to open against bias spring 35'. Thus, the bypass flow is completely controlled and directed during the heating operation by the one four port bypass valve 11 without any redundant return piping.

As shown in FIG. 3(c) the same valve is amenable to use for controlling the cooling of the zone and in fact, facilitates the use of the same controls that are used for heating to control the cooling of the zone. The cooling control is accomplished with no change in the valve but merely by changing the supply from a boiler to a chiller and thus reversing flow so that port 23 becomes the supply and port 24 the return. These changes are accomplished at the remote supply. There is no change in valving necessary at the controlled zone. The direction of flow of the heating or cooling fluid, as the case may be, is shown by the arrows shown in FIG. 3.

The vane in FIG. 3(c) is in the same position as it was in FIG. 3(b). It is the position of the vane when the zone is warmer than the desired temperature. For example when the temperature of the zone is at a desired temperature (for example, 73.5° F.) then the vane is operated to the position shown by the dotted line of FIG. 3(a). When the zone is slightly cooler than desired (for example, 73° F.) then the vane is operated to the position of FIGS. 3(a), 3(d). When the zone is slightly warmer, then the vane is operated to the position of the vane as shown in FIG. 3b, 3c.

Turning specifically to FIG. 3(c) where the operator has rotated the valve vane 26 to cause chilled fluid to flow through the fan coil from the supply piping through port 23, the check valve 17, port 15, the fan coil, port 16, through the valve and out through port 24 to the return pipe line going to the supply. The pressure differential between ports 16, 24 is relatively non-existent, therefore the bias spring 35 maintains check valve 28 closed to prevent flow therethrough. Similarly, since the pressure differential between ports 23, 16 is in the wrong direction, check valve 27 prevents any flow between the ports 16, 23 through the by-pass channel controlled by that check valve.

FIG. 3(d) shows the operation of the valve when the temperature in the controlled zone is slightly cooler than desired and the cold water supply is connected to port 23. Then the valve operator causes the vane to rotate to the position shown in FIGS. 3(a), 3(d). However, now all of the cooling fluid is by-passed to the return line. More specifically, the cooled fluid is pumped into port 23, through the valve, the by-pass passage controlled by the check valve 28 and out port 24 to the supply return line. No flow occurs through the fan coil because check valve 17 prevents any flow coming from the coil through port 15.

Thus, the valve provides a "least cost" control arrangement wherein the change over from heating to cooling control is accomplished entirely by valve changes at the fluid supply source and without any need for change at the zone controlled by the four port bypass valve or any need for a fluid temperature sensor.

Figure 4:
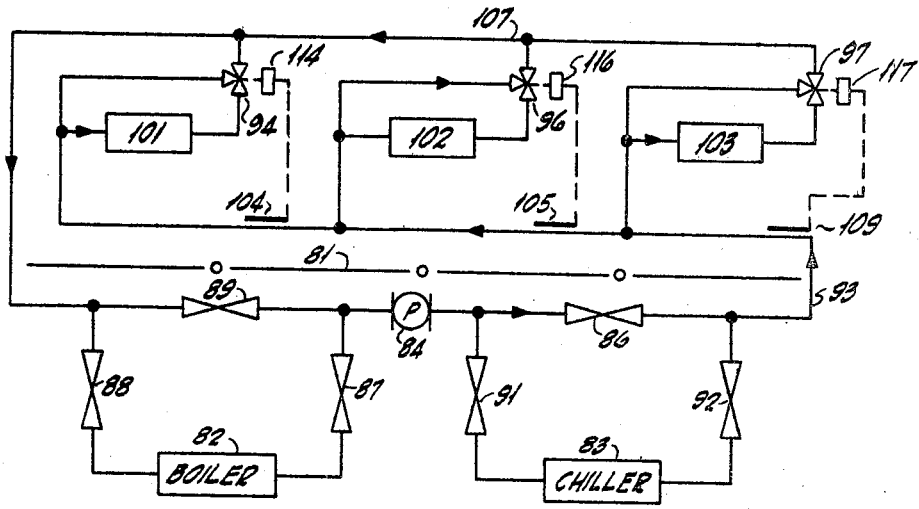
FIG. 4 is a block diagram showing of a prior art hydronic temperature control system.
Figure 4A:
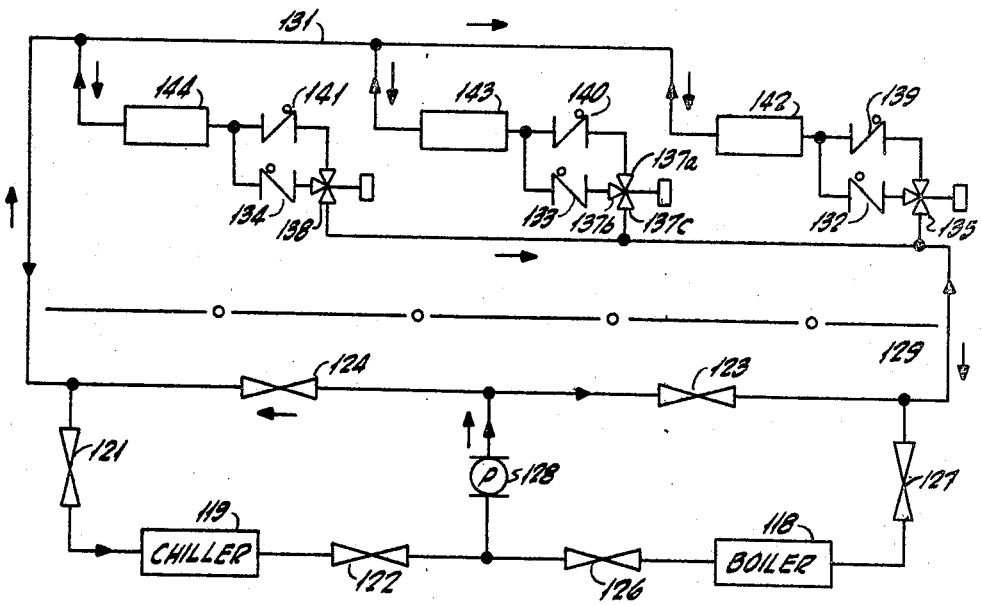
FIG. 4a is a block diagram of an inventive hydronic temperature control system using conventional control valves.
Figure 5:
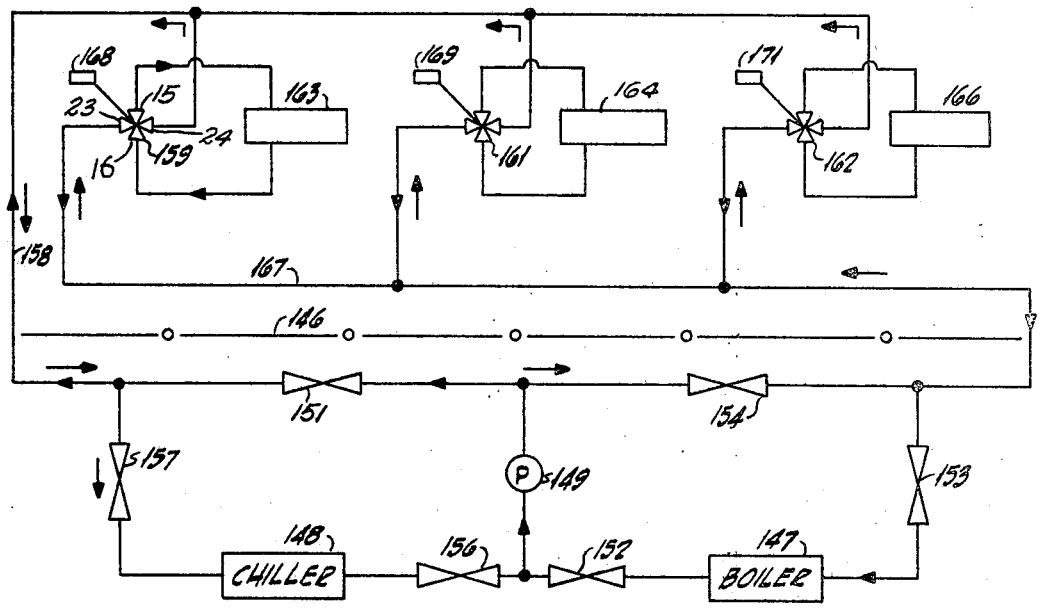
FIG. 5 is a block diagram showing of a new improved hydronic temperature control system using the inventive valve.

This and other advantages of the new valve are highlighted by comparing the hydronic temperature control systems of FIG. 4 and FIG. 5. In this comparison the advantage wherein the inventive valve enables temperature control when changing from heating to cooling and vice-versa without the use of temperature control sensing interlocks. That is, the valve controls either heating or cooling as a function of system flow direction. The systems (FIGS. 4a and 5) can convert from heating to cooling merely by operating valves at the supply without the necessity of operating valves at the temperature zones under the control of fluid temperature sensors.

The system of FIG. 4 uses the commonly known type of bypass zone control valve. Systems employing such valves are adequate for controlling either heating or cooling but have serious shortcomings in that they are not readily adaptable for both heating and cooling. This shortcoming becomes apparent by studying FIG. 4.

FIG. 4 shows a source of supply of either heated or chilled water. For example, the supply may be in the basement of a building which may be that portion of FIG. 4 below the dot dash line 81. The water supply includes a boiler 82 for heating the water that is to be used for zone heating. The supply source of modern hydronic temperature control systems also includes a chiller for cooling the water that is to be used for zone cooling. A pump 84 is used to pressurize the supply water and valves are used for directing the heated or chilled water.

In greater detail, when the system is used for heating the valves 86, 87 and 88 are opened and the valves 89, 91 and 92 are closed. The heated water then flows from boiler 82 through open valve 87, pump 84, open valve 86, pipe line 93 serving as the supply line to the zone control bypass valves 94, 96, 97. The valves are, of course, individually automatically set by valve operators. The bypass valves control the flow so that flow either goes through the respective fan coils 101, 102 and 103 to the return line 107 or goes directly to the return line 107. Each bypass valve controls its associated zone individually.

The water flows through pipeline 107 and open valve 88 back to boiler 82 where the process is repeated continuously during the heat control phase of the operation. The flow of the hot water is represented in FIG. 4 by the arrowheads shown superimposed on the pipelines.

When, for example, winter is over and the warm weather arrives, then valves 86, 87 and 88 are closed and valves 89, 91 and 92 are opened. Now pump 84 forces chilled water from chiller 83 through valve 92, line 93 again acting as the supply line to the zone control bypass valves 94, 96 and 97. The flow of chilled water may be divided at the bypass valves. That is, the bypass valves may direct all of the water to flow through the fan coil to cool the controlled zone, or all of the water to the return pipeline, or the bypass valves may send part of the water through the coil and part through the bypass to the return line. The valves are, of course, automatically set by the valve operators 114, 116, 117 respectively, which actuate the valve to open and close responsive to temperature conditions in the controlled zone.

It is important to note that the change from heating to cooling requires a reversal in valve control direction. When heating, the overheated space requires the valve to reduce coil flow. When cooling, the overheated space requires the valve to increase coil flow. Temperature sensors 104, 105 and 109 are used to establish whether hot or chilled water is flowing in the main distribution systems. These sensors then establish a specific control direction of the valves, either by electrical, pneumatic or mechanical means and in accordance with the water temperature in the main (93).

The two pipe change-over system heating or cooling is well known and always requires a control sensor of some type to reverse control direction as between heating or cooling.

Until this invention, there has been no two pipe heating-cooling change-over system known that does not require the control reversal sensor as will be specifically illustrated. This invention discloses how the temperature sensor, a complicating factor in valve design, can be eliminated.

FIG. 4a illustrates a system in which the reversal of water flow causes the control reversal needed without temperature sensors at each control valve. The part of FIG. 4a below the dot dash line illustrates the boiler 118 and chiller 119 and arrangement used in the system equipment room.

When valves 121, 122 and 123 are open with valves 124, 126 and 127 closed chilled water will flow, because of pump 128, through the piping distribution system. The flow direction will be as illustrated by arrow marks superimposed on the line drawing. Pipe 129 will be chilled water supply and pipe 131 will be chilled water return.

The checking action of valves 132, 133 and 134 will prevent flow through the ports of valves 135, 137 and 138 which are respectively adjacent to the check valves.

The only water flow path will then be through the ports of valves 135, 137 and 138 adjacent to check valves 139, 140 and 141 respectively and hence through heat transfer coils 142, 143 and 144. Specifically, for heat transfer coil 143, the water flow path will be from chilled supply main 129 to port 137 through valve 137 to port 137a, through check valve 140 through coil 143 to chilled return main 131 and back to chiller 119. Water cannot flow through port 137 even if open because of check valve 133.

The valve operator operates to open port 137c when the room is overheated and to simultaneously close port 137b. Since flow cannot occur through port 137b, control for chilled water operation occurs through port 137a. Port 137a can be described as the cooling control port.

When a heating requirement is established, flow is reversed in the mains. This is accomplished by closing valves 121, 122 and 123 and opening valves 124, 126 and 127. Hot water now uses pipe 131 as a supply main (formerly chilled water return) and pipe 129 as hot water return (formerly chilled water supply). Flow direction for heating is illustrated by arrows shown alongside the pipelines of FIG. 4a.

Referring specifically to heat transfer coil 143, for illustrative purposes, the swing direction of check valve 140 will prevent hot water from flowing through chilled water control port 137a. Flow can only occur through port 137b, the heating control port of valve 137.

Control for heating is thus established by a system flow reversal without using a temperature sensor at the valve.

FIG. 4a thus illustrates that system flow reversal can be used to eliminate the need for a temperature sensor control reverser at each valve. FIG. 4a is illustrative of reversal methods that can be developed using conventional control valves with flow reversal to eliminate the need for valve temperature sensors.

However, the use of conventional valves raises several serious operation problems. For example, three way valves, when used, do not permit coil bypass except with great complication and with a requirement for two three way valves and four check valves for each coil.

Also, conventional three way valves are not designed for a flow reversal through the valve. Another shortcoming of the FIG. 4a system and derivatives thereof, is that they establish a flow reversal through the coil. Flow reversal in a fan coil unit designed for unidirectional flow will lead to "air bind" operational problems.

FIG. 5 illustrates use of the inventive valve providing for unidirectional coil flow despite a use of the inventive feature of system flow reversal of hot versus cold water in order to effect control reversal without need for individual valve temperature sensor change over devices.

The system of FIG. 5 also shows a supply for either hot or cold water, however, because of the inventive four port valve the system of FIG. 5 overcomes the operative objections to FIG. 4a. The supply portion of the system is located below dot dashed line 146 and includes a boiler 147 and a chiller 148. A pump 149 common to both boiler and chiller is provided to pressurize the water. Valves 151, 152 and 153 are opened and valves 154, 156 and 157 are closed when the flow of hot water is desired. Conversely, the valves 154, 156 and 157 are opened and valves 151, 152 and 153 are closed when the flow of chiller water is required.

When heating is required, the flow occurs from boiler 147, through open valve 152, pump 149, open valve 151, pipeline 158 serving as the supply line during the heating function to bypass valves 159, 161 and 162. At the valves, the flow may be entirely through the respective fan coils 163, 164 and 166 located in the individual temperature controlled zones. The flow may alternatively be bypassed through the valves to the line 167, serving as the return line. The bypass valves also may direct part of the flow through the coils and bypass part of the flow. The valve operators 168, 169 and 171 associated with each of the valves, respectively, individually control the valve associated therewith responsive to the space temperature of the controlled zone as detected by any well-known thermostatic sensor not shown. The heated fluid that goes through any of the coils 163, 164 and 166, returns to the respective valves 159, 161, 162 and is directed through the return line 167, valve 153 and back to the boiler where the flow cycle is continuously repeated. The hot water flow is shown by the arrows superimposed directly on the lines depicting pipelines.

When the system is used for cooling then the flow occurs from the chiller through valve 156, pump 149, valve 154, line 167 serving as the supply line to valves 159, 161 and 162. Again, the valves individually control the flow by directing it only as required through the coils 163, 164, and 166 respectively. The flow from the coils and the bypass flow is directed by the valves to line 158 serving as the return line. The flow goes through line 158 and valve 157 to return to the chiller and to repeat the cycle. The cold water flow direction is shown by the arrows adjacent the lines representing pipelines.

Thus, the system using the four port bypass valve can provide automatic heating or cooling with a minimum of manual valve operation and a minimum of components. It should be recognized that the four port bypass valve is amenable to the control of two way flow and can therefore be used for many functions including the illustrated use in systems that provide instantaneous changeover from hot to cold liquid or cold to hot liquid.

While the principles of the invention have been described above in connection with specific apparatus and applications, it is to be understood that this description is made only by way of example and not as a limitation on the scope of the invention.

We claim:

1. A by-pass valve having four ports around the periphery thereof, said valve comprising check valve means in one of said ports for enabling a flow out of said valve through said one port and blocking flow into said valve through said one port; gate means in said valve for controlling the flow through said valve according to the position of said gate means; temperature sensing means; operator means responsive to said sensing means for positioning said gate means to a first position responsive to a low temperature condition, said first position enabling flow from a first port to said one port, said first port being adjacent to said one port and for enabling a flow from the port opposite said one port to the port opposite said first port, and for positioning said gate means to a second position responsive to a high temperature condition, said second position enabling flow from the port opposite said first port to said one port and from the port opposite said one port to said first port.

2. The four port by-pass valve of claim 1 including means for enabling flow to by-pass said gate means to flow out of said port opposite said first port when said gate means is in said second position and a supply is connected to said first port.

3. The four port by-pass valve of claim 1 including means for enabling flow to by-pass said gate means to flow out of said first port when said gate means is in said first position and a supply is connected to said port opposite said first port.

4. The four port by-pass valve of claim 2 wherein said enabling means comprises first by-pass port means for by-passing said gate means, and first by-pass means in said first by-pass port means for normally blocking by-pass flow, and means in said first by-pass means operated to enable flow to by-pass said gate means through said first by-pass port means responsive to a certain positive pressure differential between said first adjacent port and said port opposite said first adjacent port.

5. The four port by-pass valve of claim 3 wherein said enabling means comprises second by-pass port means for by-passing said gate means, and second by-pass means in said second by-pass port means for normally blocking by-pass flow and means in said second by-pass check valve means operated to by-pass said gate means through said second by-pass port means responsive to a certain positive pressure differential between said port opposite said first adjacent port and said first adjacent port.

6. The four port by-pass valve of claim 1 including first and second by-pass ports for enabling flow to by-pass said gate means, first means in said first by-pass port for enabling flow therethrough responsive to a certain positive pressure differential between the first adjacent port side of the gate and the side of the gate of the port opposite said first adjacent port but for normally blocking flow through said first by-pass port, and second means in said second by-pass port for enabling flow therethrough responsive to a certain positive pressure differential between the side of the gate opposite said first port and the first port side of the gate but for normally blocking flow through said second by-pass port.

7. The four port by-pass valve of claim 6 wherein said gate means comprises a butterfly vane.

8. The four port by-pass valve of claim 7 wherein said first and second by-pass ports are located in said butterfly vane.

9. The four port by-pass valve of claim 8 wherein said valve operator means comprises heat motor means for moving said vane.

10. The four port by-pass valve of claim 9 including vane serrations for reducing valve friction.

11. A two pipe hydronic temperature control system for controlling the temperature in certain zones by controlling the flow of either heated or chilled fluids through heat exchangers in the zones, said system comprising supply means for selectively supplying either the hot or chilled fluids, means for reversing the direction of current flow of said fluid including a four port zone control by-pass valve means controlling the flow of fluid at each said zone, means for connecting a first two of said ports that are positioned substantially opposite each other in said valve to said supply means, means for connecting the other two substantially opposite ports to said heat exchangers, temperature sensing means, and valve operator means associated with each of said valves for causing the valve means to control either the heating or the cooling of the temperature controlled zones as a function of the temperature in said zones detected by said sensor means and dependent upon whether the supply fluid is hot or chilled.

12. The temperature control system of claim 11 wherein one of said other two substantially opposite ports of said four port zone control by-pass valve means contains check valve means for enabling flow outward from said one port and blocking flow into said one port, and wherein said valve means comprises gate means positioned by said operator means to a first position responsive to a low temperature condition and to a second position responsive to a high temperature condition, said first position being such as to enable flow between a first port that is adjacent to said one port and said one port and between the port opposite said one port and the port opposite said first port, said second position being such as to enable flow between said first port and said port opposite said one port and between said port opposite said first port and said one port.

13. The temperature control system of claim 12 wherein means are provided for connecting the hot fluid supply to said first port and the return line to said port opposite said first port, and wherein first by-pass flow means are provided for enabling flow to by-pass said gate to flow to said port opposite said first port when said gate is in said second position.

14. The temperature control system of claim 12 wherein means are provided for connecting the cold fluid supply to said port opposite said first port and the return line to said first port, and wherein second by-pass flow means are provided for enabling flow to by-pass said gate to flow out of said first port when said gate is in said first position.

15. The temperature control system of claim 12 wherein first by-pass means are provided to by-pass said gate responsive to a positive pressure differential between said first port side of said gate and the side of the gate of the port opposite said first port when said gate is in said second position, and wherein second by-pass means are provided to by-pass said gate responsive to a positive pressure differential between said side of the gate of the port opposite said first port and the first port side of the gate when said gate is in said first position.

16. The temperature control system of claim 15 wherein said gate comprises a butterfly vane, and said first and second by-pass means comprise first and second ports in said vane.

17. A hydronic temperature control system for controlling the temperature in certain zones by controlling the flow of either heated or chilled fluids through heat exchangers in the zones, said system comprising supply means for selectively supplying either the hot or chilled fluids, first pipe means acting as a supply line for said hot fluids and a return line for said chilled fluids, second pipe means acting as a supply line for said chilled fluids and as a return line for said hot fluids, control valve means controlling the flow of fluid in a constant direction through said heat exchangers at each said zone, valve operator means for interconnecting selected ports on said control valve means so that said control valve controls either the heating or cooling of said zones dependent on whether said first pipe means or said second pipe means is acting as the supply line.

18. A heating/cooling system comprising a two pipe supply of tempering fluid, means for reversing the direction of current flow of said fluid in said pipes to provide a tempering fluid flow for either heating or cooling, a single-stage means for sensing the temperature of the area being heated or cooled, and valve means responsive to said sensing means for allowing said tempering fluid to either heat or cool said area.

19. The system of claim 18, wherein at least one of said pipes includes a Y connection, a pump in the stem of the Y and valves in each arm of the Y to control the direction of said flow from said pump to said pipes.

References Cited

UNITED STATES PATENTS

| 2,271,307 | 1/1942 | Ray | 251—11 XR |
|---|---|---|---|
| 2,555,012 | 5/1951 | Spofford | 165—26 |
| 2,557,035 | 6/1951 | Lichty | 165—26 |
| 3,172,600 | 3/1965 | Miner | 236—1 |
| 3,194,303 | 7/1965 | Haried | 165—29 |
| 3,241,602 | 3/1966 | Andreassen | 165—50 XR |
| 3,300,132 | 1/1967 | Grahl | 165—26 XR |
| 1,315,766 | 9/1919 | Feldman | 165—50 XR |
| 2,255,292 | 9/1941 | Lincoln | 165—50 XR |
| 3,170,508 | 2/1965 | Avery | 165—50 XR |

FOREIGN PATENTS 594,280   4/1934   Germany.

FRED C. MATTERN, Jr., Primary Examiner

MANUEL ANTONAKAS, Assistant Examiner

U.S. Cl. X.R.

165—26; 251—11